United States Patent [19]

Chillier-Duchatel et al.

[11] 4,068,042
[45] Jan. 10, 1978

[54] ELECTRIC CELL HAVING PEROXIDIZED INTERMEDIATE FORMS

[75] Inventors: Nicole Chillier-Duchatel, Sevres; Bernard Verger, Chevreuse, both of France

[73] Assignee: Societe Generale de Constructions Electriques et Mecaniques "Alsthom et Cie", Paris Cedex, France

[21] Appl. No.: 629,528

[22] Filed: Nov. 6, 1975

[30] Foreign Application Priority Data

Nov. 22, 1974 France .................. 74.38447

[51] Int. Cl.² ............................................. H01M 8/18
[52] U.S. Cl. ................................................... 429/19
[58] Field of Search ............. 136/86 R, 86 E; 429/17, 429/19

[56] References Cited

U.S. PATENT DOCUMENTS

| | | | |
|---|---|---|---|
| 3,294,588 | 12/1966 | Beltzer et al. ............. | 136/86 E |
| 3,300,342 | 1/1967 | Klass ........................ | 136/86 E |

OTHER PUBLICATIONS

Status Report on Fuel Cells, PB 151804, B.R. Stein, Jun. 1959 p. 20.

Primary Examiner—John H. Mack
Assistant Examiner—H. A. Feeley
Attorney, Agent, or Firm—Flynn & Frishauf

[57] ABSTRACT

The invention provides an electric cell having an anode compartment, a cathode compartment, and a membrane separating said compartments. The cell also has a peroxidation vessel in which sodium anthraquinone-2,7-disulfonate is peroxidized. The peroxide then decomposes to form a mixture of hydrogen peroxide and the anthraquinone oxide. This mixture is fed to the cathode compartment. When the electric cell is operated as a fuel cell, the anthraquinone oxide from the cathode compartment is conveyed to a reduction vessel in which it is reduced by contact with fuel. All or a portion of the reduced anthraquinone is then contacted with oxygen to form the anthraquinone oxide. The electric cell may also be utilized as a storage battery. The invention also includes the method of operating these electric cells.

1 Claim, 2 Drawing Figures

ELECTRIC CELL HAVING PEROXIDIZED INTERMEDIATE FORMS

The present invention concerns an electric cell, more particularly of the fuel cell type or of the storage cell type utilizing intermediate peroxidised compounds which decompose to an oxide and to a hydrogen peroxide solution.

It is known that fuel cells have a theoretical efficiency of conversion of chemical energy into electric energy which is particularly high.

Such a characteristic results from the fact that such systems escape from the limitation due to the Carnot cycle.

Nevertheless, in the case of cells using, as a combustible reactant, pure oxygen or air, present efficiencies, at low temperature, of the electrode at the level of which such a gas is supplied do not make it possible to obtain suitable efficiencies, even when such an electrode comprises an active catalyst such as platinum, which is, moreover, expensive.

The present invention makes it possible to overcome the disadvantages outlined above and it has as its object an electric cell in which an intermediate peroxidised form which decomposes spontaneously to form an oxide and a hydrogen peroxide solution is supplied. The said cell is suitable for providing a high potential while having a moderate cost price.

The invention therefore has as its object an electric cell comprising a cathode and an anode separated by a membrane defining a cathode compartment and an anode compartment, characterized in that the said cathode compartment is fed with a hydrogen peroxide solution and an oxide both resulting from the decomposition of a peroxidised form of a compound.

Other advantages and characteristics of the invention will become apparent from the following description, given by way of a purely illustrating example, having no limiting character, with reference to the accompanying drawings and diagrams in which.

It is known that certain substances and more particularly anthraquinonic and alcoylanthraquinonic derivatives in reduced form can react with the oxygen in air to form a particularly oxidising peroxidised form, which produces a hydrogen peroxide solution and to oxide by decomposition.

Moreover, the derivatives of anthraquinone are chemically reduced particularly well.

The applicants therefore conceived the idea of using such substances in fuel cells, using the reduced form to effect, on the one hand, the oxidation on the anode and, on the other hand, oxidation by oxygen to obtain the peroxidised form which decomposes to a hydrogen peroxide solution more particularly and which will be reduced on the cathode at a higher potential than that which the direct electrochemical reduction of the oxygen on an electrode would have given.

Figure 1:
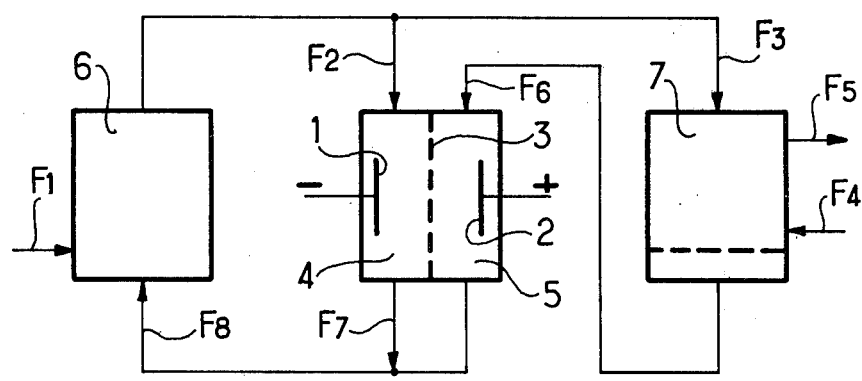
FIG. 1 shows diagrammatically a fuel cell according to the invention.

Consequently, FIG. 1 shows a fuel cell comprising an anode 1, a cathode 2, separated therefrom by a membrane 3 defining an anode compartment 4 and a cathode compartment 5.

Reference 6 designates a reduction enclosure or reactor fed in the direction of the arrow F1 with a fuel such as, for example, hydrazine, hydrogen, methanol, sulphurated hydrogen, ammonia, a hydrocarbon or the like, the said reactor containing a peroxidisable derivative which can be of the anthraquinonic type, for example anthraquinone 2-7 sodium or lithium disulfonate.

That reactor feeds, on the one hand, the anode compartment 4 of the cell, in the direction of the arrow F2 and, on the other hand, an enclosure or peroxidisation reactor 7 in the direction of the arrow F3, which is fed in the direction of the arrow F4 with air or oxygen, the by-products resulting from the reaction, more particularly excess air and water vapour being removed in the direction of the arrow F5.

Moreover, the arrow F6 shows that the said peroxidation enclosure 7 feeds the cathode compartment 5 of the cell.

Furthermore, the arrows F7 and F8 show that the products coming respectively from the anode compartment 4 and the cathode compartment 5 are sent back into the reduction enclosure 6.

It will be therefore seen that the anthraquinone derivative reduced in the enclosure 6 by the fuel is oxidised in the anode compartment 4, then sent back in the direction of F7 into the enclosure 6 where it is again reduced.

The fraction in a reduced form conveyed in the direction of F3 into the enclosure 7 is transformed into the peroxide by the air, that peroxide decomposing into a hydrogen peroxide solution and into the simple oxidised form, which are conveyed in the direction of F6 into the cathode compartment 5 of the cell where the hydrogen peroxide solution is partly or completely reduced to the state of water. The simple oxidised form is sent back in the direction of F8 into the enclosure 6, where it is completely reduced.

Figure 2:
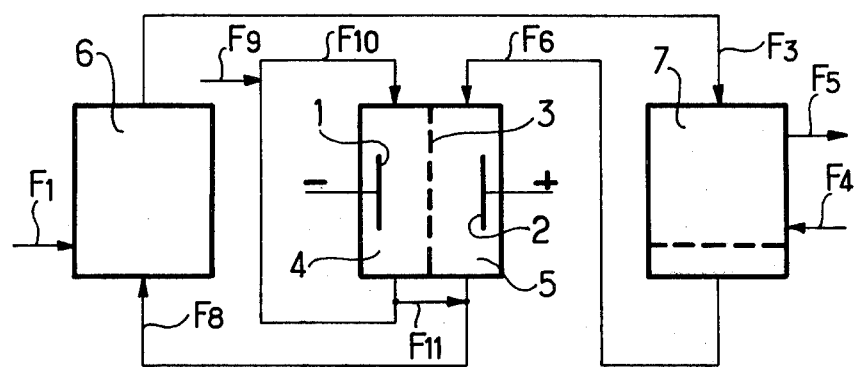
FIG. 2 shows diagrammatically a variant of embodiment of a fuel cell according to the invention.

FIG. 2 shows a variant of embodiment of the previously described cell, suitable for being implemented in the case where a fuel such as hydrazine which is very reactive from the electrochemical point of view, is used.

Reference 6 also designates in that case the reduction enclosure fed in the direction of the arrow F1 with fuel and containing the anthraquinonic derivative. That enclosure 6 feeds exclusively the enclosure or peroxidation reactor 7, in the direction of the arrow F3, which receives, in the direction of the arrow F4 air or oxygen, with the by-products resulting from the reaction being removed in the direction of the arrow F5.

Moreover, the arrow F6 shows that the said peroxidation enclosure 7 feeds, as in the preceding case, the cathode compartment 5 of the cell, the arrow F8 showing that the products coming from the cathode compartment 5 are sent back into the reduction enclosure 6.

But in that case, a part of the fuel, namely the hydrazine, for example, is injected directly and recycled in the cell as shown by the arrows F9 and F10, the arrow F11 showing that the overflow of the said fuel is sent back into the reduction enclosure 6.

It will therefore be seen, in that case, that anthraquinonic derivative reduced in the enclosure 6 by the fuel is conveyed in the direction of F3 into the enclosure 7 where it is transformed into peroxide by the air, that peroxide decomposing to give rise to hydrogen peroxide and the oxide, conveyed in the direction of F6 into the cathode compartment 5 of the cell where the hydrogen peroxide solution is partly or completely reduced. The oxidised form is, on its return, sent back in the direction of F8, into the enclosure 6 where it is completely reduced.

In such cells, an electrolyte which is either acid, neutral or basic can be used.

Of course, compositions other than derivatives of anthraquinone can be used providing that when they come into contact with oxygen the reduced form to the peroxidised form, which decomposes to give a hydrogen peroxide solution and an oxide and that the potentials between the reduced form is oxidized and the hydrogen peroxide solution be sufficiently different to constitute a cell.

Besides having simplicity of operation, such cell structure makes it possible to be free from a certain number of conventional requirements, namely, more particularly, the use of a methanol recovering system.

Moreover, the operating temperature being close to 75° C, the water formed is completely removed in the form of steam. Likewise, the removal of the gases produced is effected with the exhaust air which had been used as an oxidant.

It should also be observed that the cost price of such a system is relatively low, for it makes use of conventional reduction and peroxidation reactors or enclosures operating under optimum conditions.

Of course, such a structure is applicable to a storage cell consuming air.

It must be understood that the invention is in no way limited to the embodiments described and illustrated, which have been given only by way of an example.

More particularly, without going beyond the scope of the invention, details can be modified, certain arrangements can be changed or certain means can be replaced by equivalent means.

What is claimed is:

1. An electric cell for producing electric current comprising
   a cathode compartment containing a cathode,
   an anode compartment containing an anode,
   a membrane separating said compartments,
   a peroxidation vessel containing an oxygen feed inlet and adapted to react oxygen with sodium anthraquinone-2-7-disulfonate to form the anthraquinone peroxide of said sodium anthraquinone disulfonate,
   means for containing anthraquinone peroxide formed in said peroxidation vessel while it decomposes into a mixture of hydrogen peroxide and the anthraquinone oxide,
   means for feeding said mixture of hydrogen peroxide and anthraquinone oxide to said cathode compartment wherein hydrogen peroxide is reduced,
   conduit means coupling an outlet of said cathode compartment to a reduction vessel which contains a fuel inlet and adapted to reduce said anthraquinone oxide to the reduced form by reaction with said fuel,
   conduit means coupling an anode outlet with said reduction vessel, and
   means for conveying a portion of the reduced anthraquinone oxide from said reduction vessel to said anode compartment and the remainder of said reduced anthraquinone oxide to said peroxidation vessel.

* * * * *